United States Patent [19]

Rohrbacher

[11] E Patent Number: Re. 31,795

[45] Reissued Date of Patent: Jan. 8, 1985

[54] APPARATUS FOR ROLLING CHAIN LINK FENCE

[76] Inventor: Herbert E. Rohrbacher, 8695 Via Santa Cruz, Whittier, Calif. 90605

[21] Appl. No.: 553,051

[22] Filed: Nov. 18, 1983

Related U.S. Patent Documents

Reissue of:

[64] Patent No.: 4,353,512
Issued: Oct. 12, 1982
Appl. No.: 224,952
Filed: Jan. 14, 1981

[51] Int. Cl.[3] ..... B65H 75/00; B65B 63/04

[52] U.S. Cl. ..... 242/54 R; 242/55; 242/67.1 R; 53/118; 53/430

[58] Field of Search ..... 242/54 R, 55, 55.1, 242/67.1 R, 67.2, 75.1, DIG. 3; 100/87, 88; 53/118, 430

[56] References Cited

U.S. PATENT DOCUMENTS

| | | | |
|---|---|---|---|
| 2,914,270 | 11/1959 | Parker | 242/86.5 R |
| 3,501,106 | 3/1970 | Case | 242/67.1 R |
| 3,532,281 | 10/1970 | Verstraete | 242/55 |
| 3,812,640 | 5/1974 | Knott | 53/119 |
| 4,139,976 | 2/1979 | Herrig | 242/54 R X |
| 4,249,359 | 2/1981 | Herrig | 53/118 |

FOREIGN PATENT DOCUMENTS 1594975 7/1970 France .

*Primary Examiner*—Stanley N. Gilreath
*Assistant Examiner*—Lloyd D. Doigan
*Attorney, Agent, or Firm*—Charles H. Schwartz; Ellsworth R. Roston

[57] ABSTRACT

An apparatus for rolling chain link fence including an endless belt including a free loop portion and with the endless belt moved in a particular direction and with the movement of the endless belt producing rotative motion in the free loop portion, and with progressive portions of the chain link fence fed into the free loop portion and with at least the free loop portion of the endless belt supporting the progressive portions of the chain link fence to have the individual links of the chain link fence collapse against each other to provide for a tight configuration of the chain link fence within the free loop portion, and with the rotative motion of the free loop portion of the endless belt producing a rolling of the progressive portions of the chain link fence with the individual links collapsed against each other to form a roll of chain link fence with a tight configuration and a small diameter.

28 Claims, 11 Drawing Figures

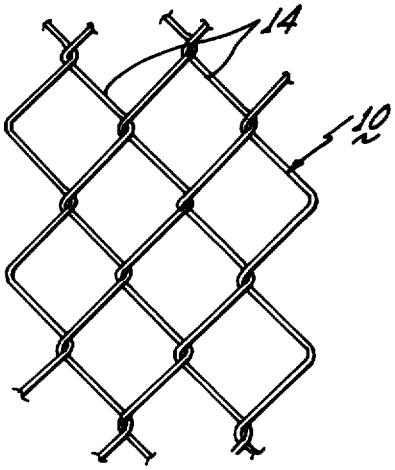
FIG. 1A
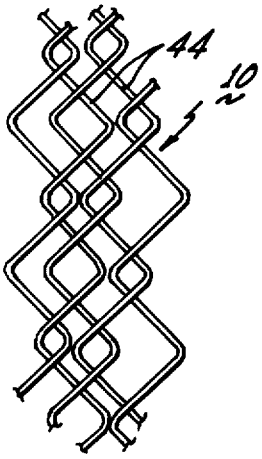
FIG. 1B
FIG. 3
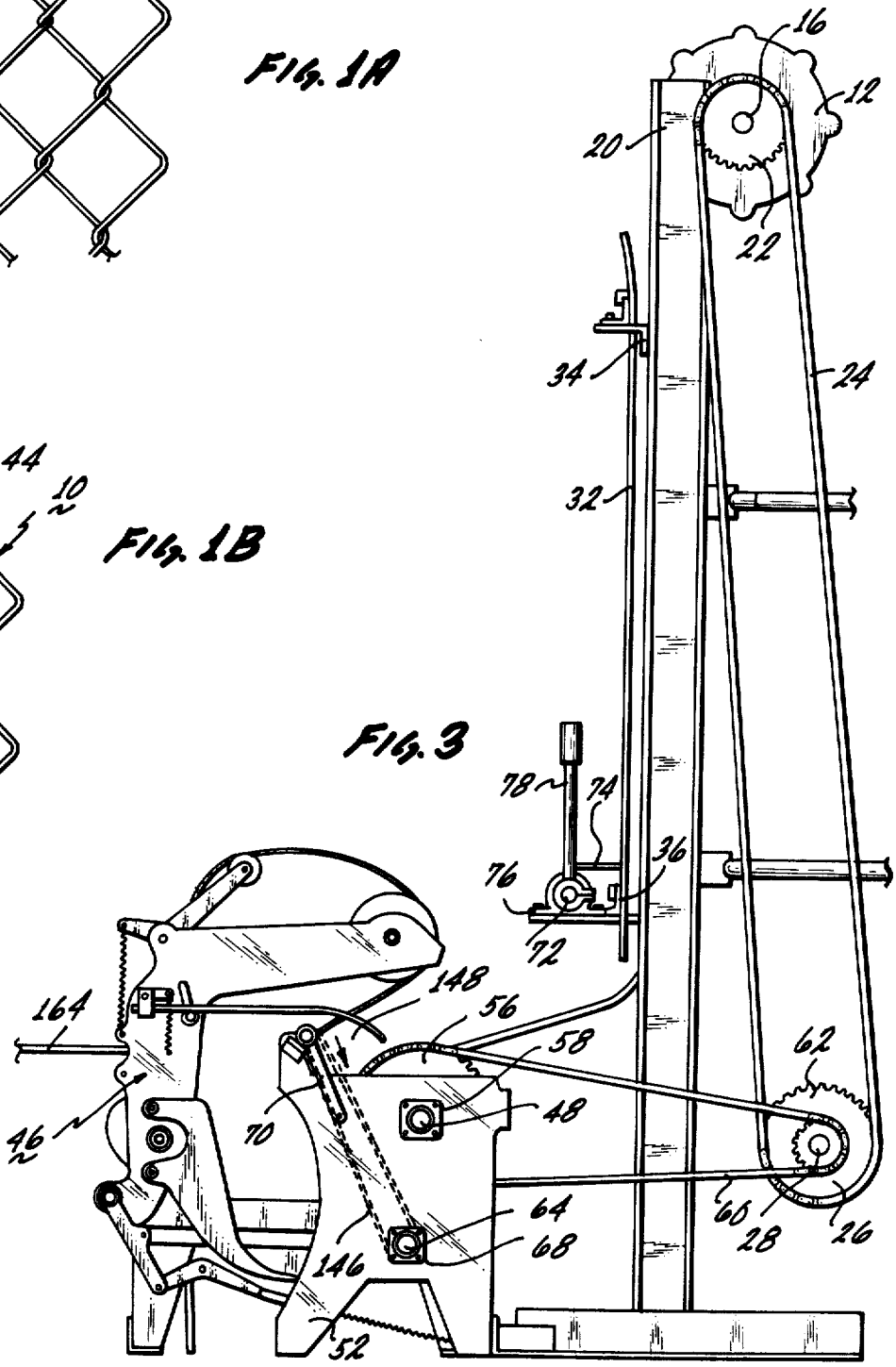

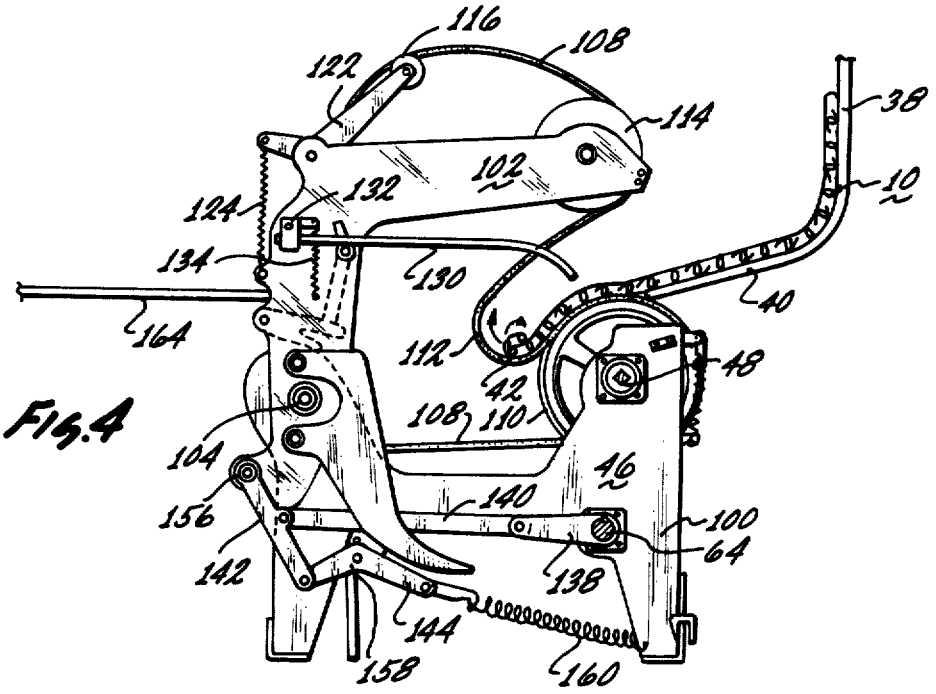
Fig. 4
Fig. 5
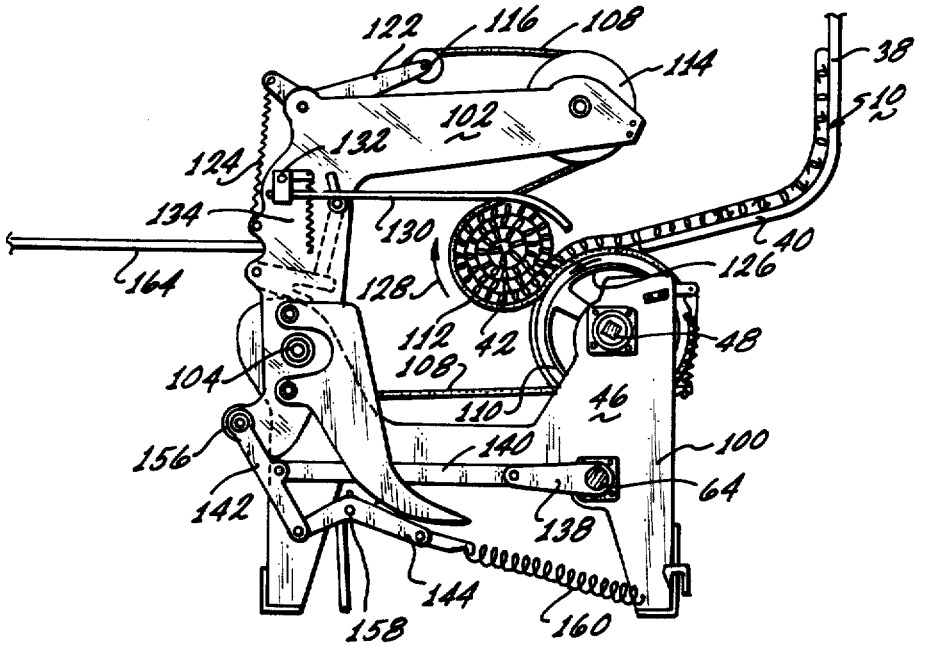

APPARATUS FOR ROLLING CHAIN LINK FENCE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus for rolling chain link fence. Specifically, the apparatus of the present invention provides for the rolling of chain link fence with the links in a collapsed state to produce rolls having a tighter configuration. With the apparatus of the present invention rolls are produced from a predetermined length of fencing and with these rolls having a smaller diameter than rolls produced by prior art apparatus.

2. Description of the Prior Art

In the prior art apparatus has been used to provide for the rolling of predetermined lengths of chain link fence into rolls for shipment. With the prior art apparatus, the links of the chains link fence are held in an open position by the rolling apparatus and the individual rolls of chain link fence are accordingly made with the links in the open position. The prior art rolling apparatus therefore produces rolls having a predetermined diameter in accordance with the length of the chain link fence. The prior art rolling apparatus did facilitate the rolling of chain link fence but the links are held in an open configuration so that the diameter of the roll is large relative to the weight of the roll. When shipping rolls of chain link fence, it has been determined that the volume of shipping space is filled, or the height of the pile of rolls becomes too high before the weight limitations are exceeded. Therefore, it would be desirable to provide for the rolling of chain link fence into a tighter roll configuration having a smaller diameter so that more rolls of chain link fence can be fitted into a given volume.

SUMMARY OF THE INVENTION

With the present invention the chain link fence is rolled with the links in a collapsed state to form a roll having a tighter and more closely packed structure so that for a predetermined length of fence a roll is produced having a smaller diameter than rolls produced by prior art rolling apparatus. For example, the apparatus of the present invention has been found to produce rolls of approximately one-third ($\frac{1}{3}$) less diameter than prior art rolls for the same length of chain link fence.

In the apparatus of the present invention the individual links of the chain link fence are allowed to collapse towards each other as predetermined lengths of the chain link fence are rolled into rolls. In particular, the chain link fence with the collapsed links is rolled upon itself by an endless belt which retains the links in the collapsed state as the roll is produced by movement of the endless belt. The roll is actually retained within a free loop portion of the belt and with the free loop portion of the belt conforming to the size of the roll as the roll becomes larger upon the rolling of additional portions of the chain link fence. As the roll is being formed in the free loop portion of the endless belt a spring loaded arm member is positioned against the upper surface of the roll to insure the proper forming of the roll within the free loop portion.

After each roll is formed from a predetermined length of chain link fence, the rolling apparatus of the present invention is actuated to a released position where the endless belt is straightened out to have a horizontal configuration. This allows for the roll to be removed from the rolling apparatus of the present invention. The apparatus of the present invention may be positioned adjacent to the end of a standard machine for making chain link fences so that the rolls having the tight or small pack configuration of the present invention may be formed contemporaneously with the manufacture of the chain link fence.

BRIEF DESCRIPTION OF THE DRAWING

A clearer understanding of the present invention will be had with reference to the following description and drawings wherein;

FIG. 1A illustrates the chain link fence as normally configured in the prior art during the rolling of the chain link fence;

FIG. 1B illustrates the collapsed configuration of the links of the chain link fence as the chain link fence is rolled by the apparatus of the present invention;

FIG. 3 is a side view of the system of FIG. 1 showing the apparatus of the present invention positioned at the end of a machine for making chain link fence;

FIG. 4 is a side view of the apparatus of the present invention in the initial stage of producing the roll with the links in the collapsed state;

FIG. 5 is a side view of the apparatus of the present invention at a later stage of the rolling of the chain link fence;

DESCRIPTION OF THE PREFERRED EMBODIMENT

Figure 2:
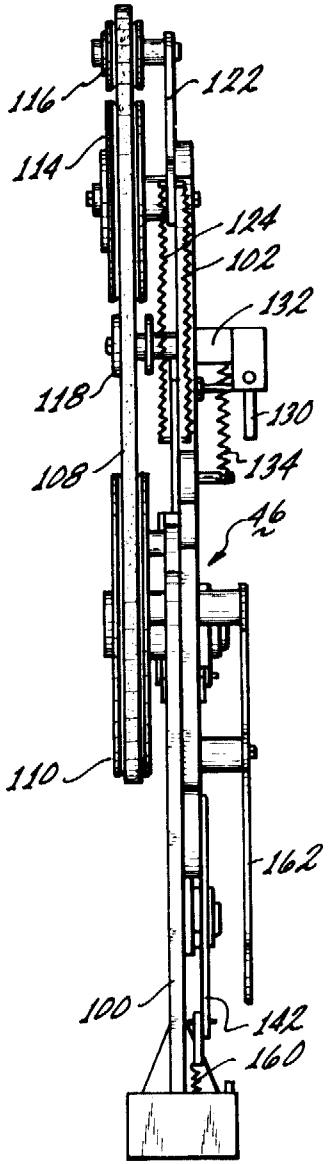
FIG. 2 is a front view of an apparatus of the present invention for rolling chain link fence.
Figure 1:
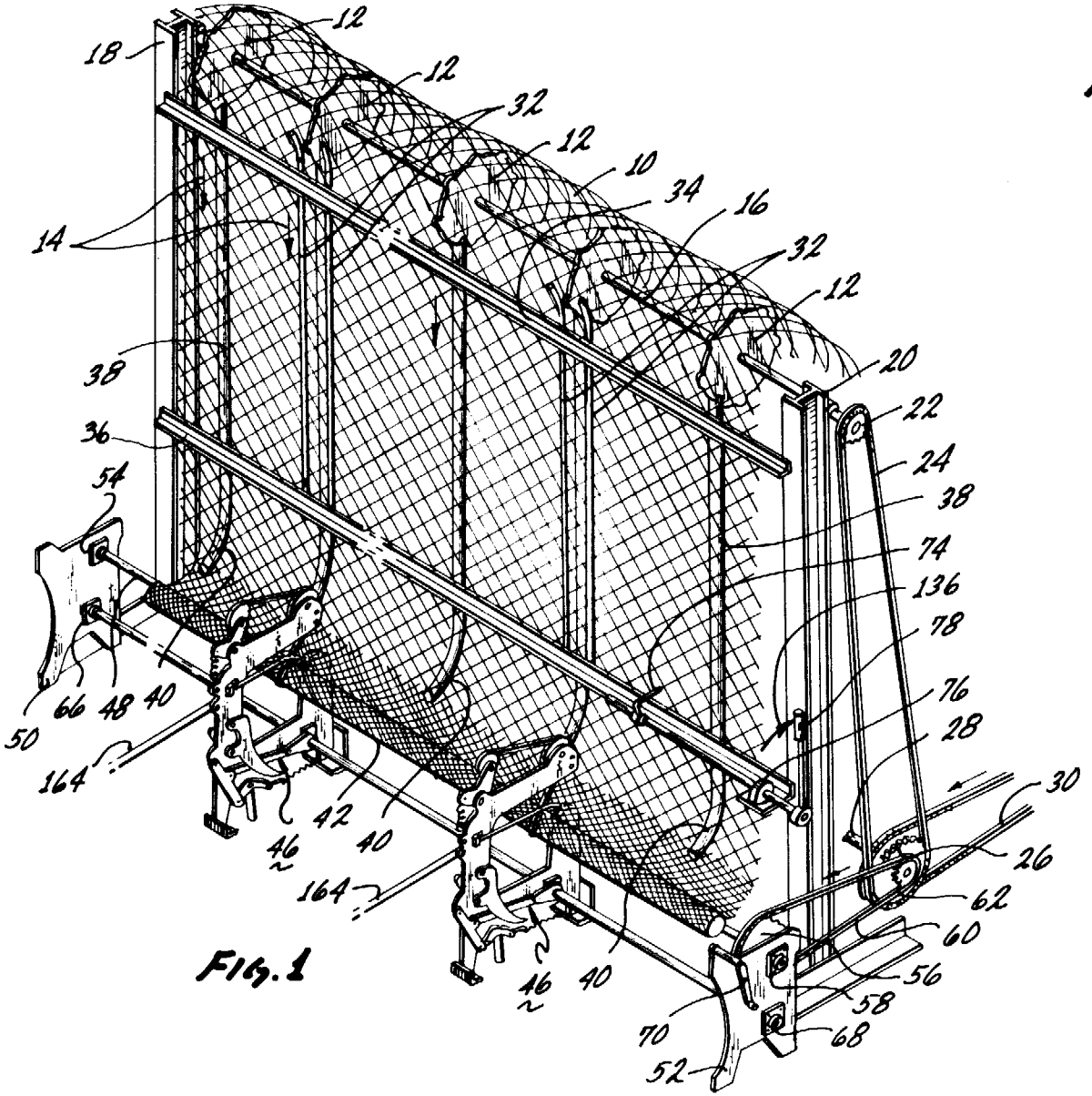
FIG. 1 illustrates a perspective view of the apparatus of the present invention positioned adjacent to the end of a machine for manufacturing chain link fence and showing two spaced apparatus for rolling the chain link fence into a tight configuration.

As shown in FIG. 1, an apparatus constructed in accordance with the teachings of the present invention is positioned at the end of a machine for making chain link fence. Specifically, as chain link fence 10 is manufactured, the chain link 10 passes over and is guided by a series of cogged wheels 12. The cogged portion of the wheels 12 actually engage individual links in the chain link 10 to move the chain link from the machine manufacturing the chain link in a downward direction as shown by arrows 14. The cogged wheels 12 are supported for rotation on a shaft 16 and with the ends of the shaft journaled in bearings supported by side rails 18 and 20. The shaft 16 extends past the end of the rail 20 and a gear 22 is mounted for rotation with the shaft 16. A toothed belt 24 passes over the gear 22 and is driven by another gear 26 at the lower of the belt 24. The gear 26 is supported on a shaft 28 and the shaft 28 is driven from a central source of power through another belt 30.

The chain link fence 10 moves in the direction 14 and is guided downward as the chain link passes between vertically extending rods. For example, two sets of vertically extending rods 32 are supported by horizontal rails 34 and 36 which in turn are attached to the vertical rails 18 and 20. The chain link fence 10 is located behind the vertical rods 32. A plurality of additional vertical rods 38 having curved bottom portions 40 are located behind the chain link fence 10 so the chain link is guided downward between the rods 32 and the rods 38. As the chain link 10 reaches the portion 40 of the rods 38, the chain link is guided from a vertical to a more horizontal position and the links of the chain link fence 10 start to collapse upon each other as the chain link is received by apparatus 46 for rolling the chain link fence. The apparatus 46 is positioned at the end of the portions 40 of the rods 38. In particular, the chain link fence 10 is shown being rolled into a roll 42, and with the roll 42 formed with the links in a collapsed state.

FIG. 1A illustrates the chain link fence 10 and shows individual links 44 separated from each other to have the chain link fence 10 in an open configuration. As indicated above, the prior art apparatus for rolling chain link rolled the chain link with the links 44 in the open configuration. As shown in FIG. 1B, the chain link fence 10 has the links 44 collapsed towards each other so that the links 44 are closer to each other than as shown in FIG. 1A. With the apparatus of the present invention the rolls of chain link fence are formed with the links 44 in the collapsed state so as to produce a tighter or smaller pack roll for the same length of chain link fence. It will be appreciated that when the rolls of chain link fence, which are rolled in accordance with the teachings of the present invention, are unrolled for installation, the links are pulled apart during the installation of the fence to form the open configuration as shown in FIG. 1A.

As illustrated in FIG. 1, two apparatus 46 are positioned adjacent to the ends 40 of the rods 38 so as to receive and roll the chain link fence into a roll 42 with the tight configuration described above. Although the present embodiment of the invention is disclosed using a pair of rolling apparatus 46, it is to be appreciated that for different size chain link fence more or less apparatus 46 may be used.

As shown in FIG. 1, each apparatus 46 is driven using a common drive shaft 48 supported at its ends by stand members 50 and 52. One end of the shaft 48 is journaled for rotation in the stand 50 at position 54. The other end of the shaft 58 supports a gear 56 and with the shaft and gear journaled for rotation in the stand 52 at the position 58. The gear 56 is driven by a toothed belt 60 which in turn is rotated by a gear 62, mounted on a common shaft for rotation with the gear 26. It can be seen therefore, that all of the various rotary elements in the system rotate together in syncronism through the use of the gears and the toothed belts.

Each rolling apparatus 46 also has a releasing mechanism and both apparatus 46 are released together using a common shaft 64. The shaft 64 passes through both rolling apparatus 46 and is journaled for rotation in the stand 50 at the position 66. The other end of the shaft 64 is journaled for rotation in the stand 52 at the position 68. An actuating handle 70 is interconnected with the shaft 64 by a belt drive (not shown in FIG. 1) so as to provide for rotation of the shaft 64 in accordance with rotation of the handle 70.

The apparatus of FIG. 1 also includes a mechanism for stopping the movement of chain link fence 10 in the direction 14. Specifically, a shaft 72 supports a series of chain stops 74 (one shown in FIG. 1). The shaft 72 is supported for rotation by bracket 76 extending from the rail 36.

A handle 78 is used to provide for rotation of the shaft 72 so that the chain stop 74 will engage individual links 44 of the chain link fence 10 to support the chain and prevent the chain link fence 10 from moving downward. Normally, the chain stop mechanism is used to support the front end of each predetermined length of chain link fence as the roll 42 is being removed from the rolling apparatus 46.

Figure 6:
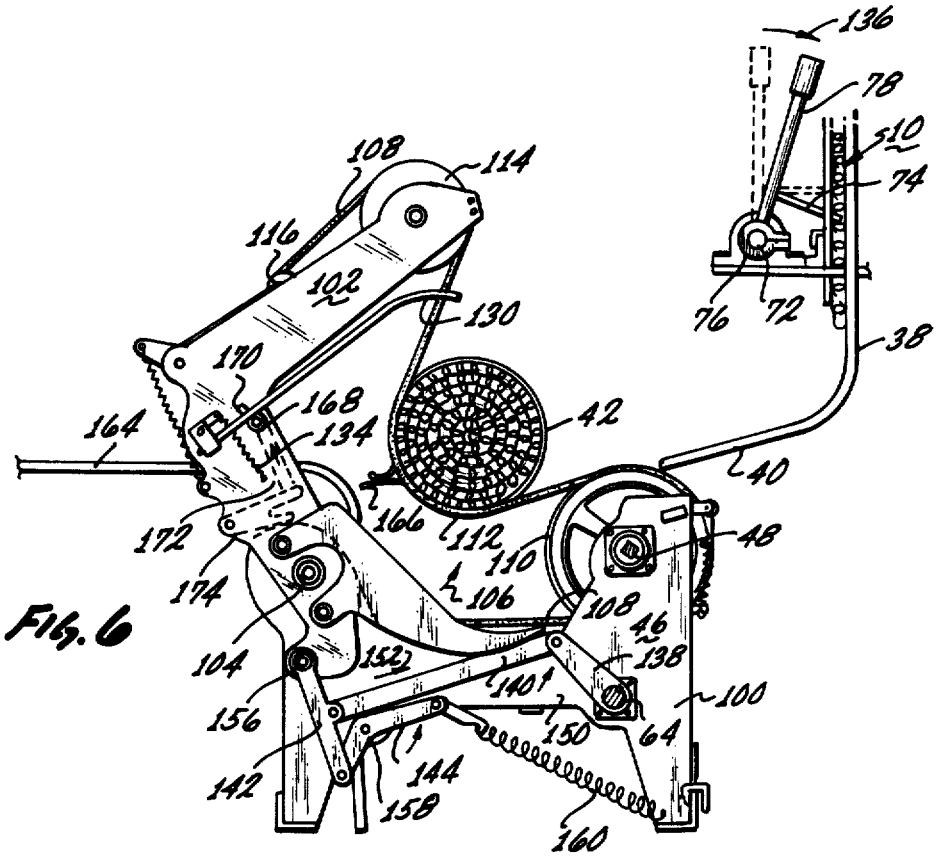
FIG. 6 illustrates the apparatus of the present invention with a completed roll and with the apparatus initially released after the completed roll has been banded.
Figure 7:
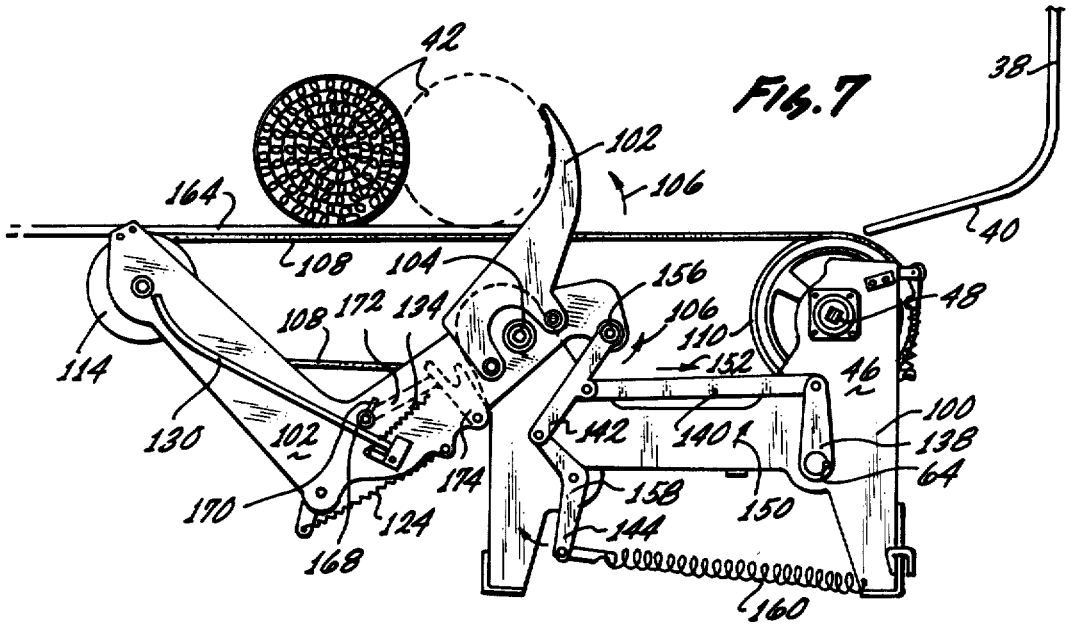
FIG. 7 is a side view of the apparatus of the present invention with the apparatus released to provide for the endless belt in a horizontal configuration and with the roll of chain link fence free from the rolling apparatus.
Figure 8:
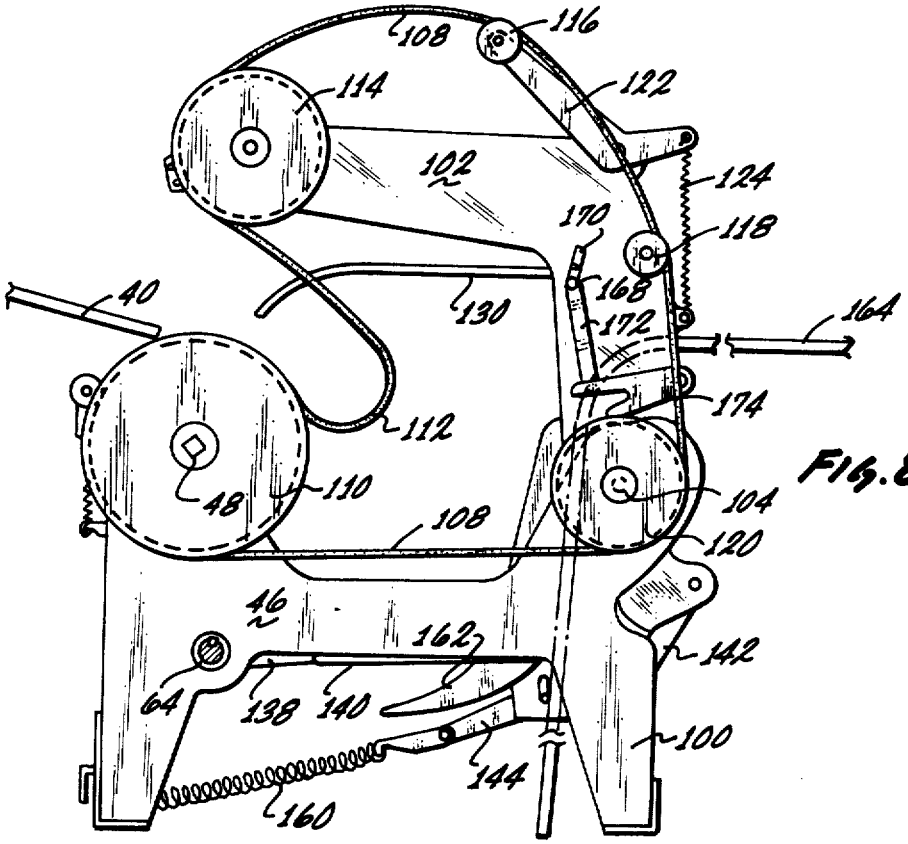
FIG. 8 is an opposite side of the apparatus of the present invention showing the endless belt in more detail.
Figure 9:
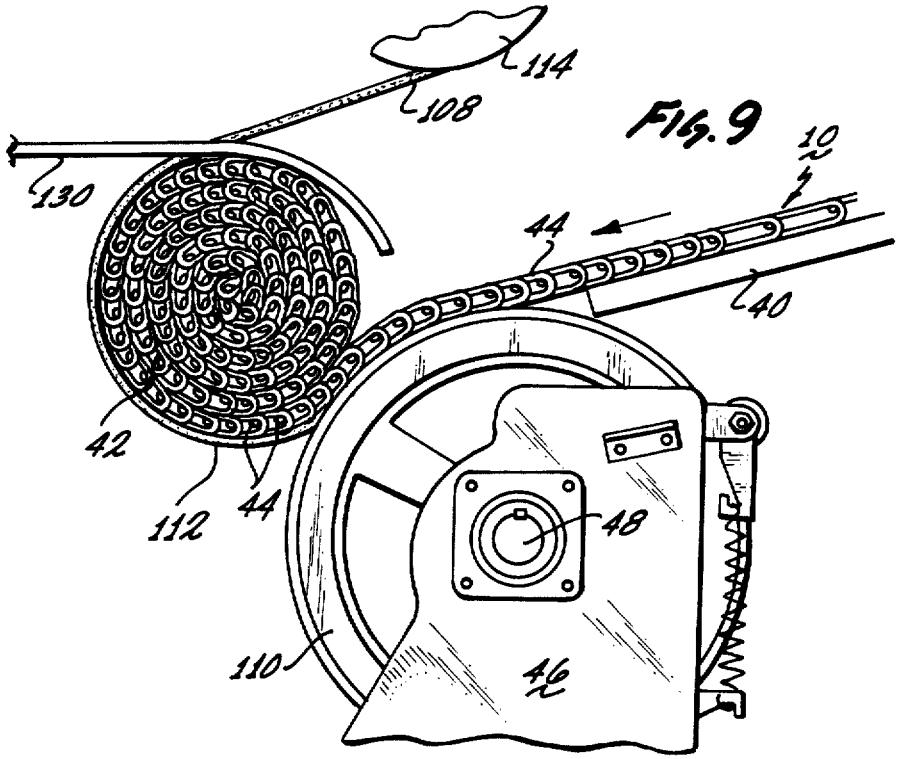
FIG. 9 is a fragmentary view of the apparatus of the present invention showing the rolling of the chain link fence with the links in a collapsed position.

FIG. 3 illustrates a side view of the apparatus of FIG. 1 and a number of the elements described above can also be seen with reference to FIG. 3. A front view of the rolling apparatus 46 is shown in FIG. 2 and FIGS. 4 through 7 illustrate one side view of the rolling apparatus 46 at different stages in the rolling operation. FIG. 8 illustrates the other side view of the rolling apparatus of 46 and FIG. 9 is an expanded fragmentary view which is helpful in understanding the operation of the rolling apparatus 46.

As can be seen in the various views described above, each rolling apparatus 46 includes a main frame 100 which supports the various components forming the rolling apparatus. A subsidiary frame member 102 is pivotably mounted at one end of the main frame 100. The main frame 100 is formed by two leg portions, a cross portion and two upwardly extending arm portions. As can be seen in FIGS. 6 and 7, the subsidiary frame member 102 is pivotably mounted about point 104 and the frame member 102 may be actuated to rotate in the direction shown by the arrows 106 in FIG. 7.

The main frame 100 and the subsidiary frame 102 each support a plurality of rollers which in turn support an endless belt 108. The plurality of rollers include a main actuating roller 110 which is mounted on the shaft 48 and provides for the movement of the belt 108. A free loop portion 112 of the belt 108 is formed between the roller 110 and a roller 114 located at the end of the subsidiary frame 102. The free loop portion 112 of the belt 108 is used to provide for the rolling of the chain link fence 10 to form the roll 42 and with the individual links 44 in the collapsed state. This provides for the roll 42 having a smaller diameter for a predetermined length of chain link fence than prior art rolling apparatus.

The belt 108 also passes over small guide rollers 116 and 118, both mounted on the subsidiary frame member 102, and a large guide roller 120 mounted for rotation on the main frame member 100 about the pivot point 104. This may be seen clearly with reference to FIG. 8. The guide roller 116 is acutally supported at the end of a small subsidiary arm 122 and with a spring member 124 operating to bias the roller 116 in an upward direction and thereby remove excess slack in the belt.

The actuating roller 110 is rotated in the direction shown by the arrow 126 (as shown in FIG. 5) to thereby produce movement of the belt 108 in the direction shown by the arrow 128. The movement of the belt 108 and in particular the rotary action of the belt in the free loop portion 112 is used in association with the progressive entrance of the chain link fence 10 into the free loop portion and provides for the roll 42 of chain link fence to be progressively formed within the free loop portion 112. This can be seen with reference to FIGS. 4, 5 and 9, which show the progressive forming of the roll 42 of chain link fence with the individual links 44 in a collapsed state.

In FIG. 4 the initial formation of the roll 42 is shown. In particular the operator of the apparatus may take the leading end of the chain link fence 10 and with the links collapsed against each other as shown in FIG. 1B and may provide for a turn or two or even just a bunching together of a number of links 44. FIG. 4 shows the roll 42 in its initial stage having just a turn or two. As the chain link fence 10 moves downward between the vertical 32 and 38, the weight of the chain link provides for the individual links 44 to be open as shown in FIG. 1A. As the direction of movement of particular portions of the chain link 10 is changed due to the sloping portion 40 of the rods 38, the particular portions of the chain link are now being supported by the portion 40 of the rods 38. As the particular portion of the chain link fence start to approach the belt 108 and specifically the free loop portion 112 of the belt 108, the individual links 44 of the fencing start to collapse on each other as shown in FIG. 9. This occurs since the particular portions of the chain link fence 10, which are being formed into the roll 42, are being supported in the free loop portion 112 and this support negates the force of gravity so that the individual links 44 can collapse on each other. In the prior art the rolling is accomplished using toothed wheels similar to the wheels 16 shown in FIG. 1 and these wheels would tend to stretch the links to the open state shown in FIG. 1A.

With the present invention, the fencing is allowed to have the individual links collapse on each other by supporting the end roll 42 to thereby counteract the force of gravity. The free loop portion 112 of the belt 108 allows for the collapsed links 44 in the chain link fence 10 to be formed progressively into the roll 42. The free loop portion 112 can therefore expand as the roll 42 grows larger as shown in FIGS. 5 and 9. The movement of belt 10 gently urges the collapsed links 44 to be formed into the roll 42 but yet the free loop portion 112 supports the roll so that the links collapse against each other as the chain link fence 10 enters the belt 108. If the belt 108 was not moved the links might just collapse against each other in a haphazard fashion in the free loop portion 112.

As the roll 42 gets progressively larger the roll would tend to roll upward thereby hindering the formation of the roll with the links in the collapsed state. A spring biased arm member 130 is therefore used to capture an upper outside surface of the roll 42 and prevent the roll from moving upward and out of the free loop portion 112. This can be seen clearly with reference to FIGS. 5 and 9. The arm 130 is biased in a downward direction by having the arm pivot around a point 132 and with a spring member 134 providing a spring force to produce the downward bias.

Typically during the manufacturing of the chain link fence, at periodic positions, such as every 50 or 100 feet, one of the links 44 is left untwisted at its end positions. This allows for the link to be removed to separate the chain link and thereby provide for individual predetermined lengths of chain link fence. The link would typically be removed after the particular link has passed the point represented by the rod 72 in FIG. 1. Specifically, the link can be removed when it reaches the position represented by the portion 40 of the rod 38. The chain stop mechanism may be engaged by pushing the handle 78 shown in FIGS. 1 and 6 in the direction shown by arrow 136. The chain stop arms 74 move forward to engage the links 44 of the chain 10 and thereby prevent the downward movement of the chain link while the roll 42 is initially tied for removal for the rolling apparatus 46. The roll 42 may be completed as shown in FIG. 6 to form the individual rolls of chain link fence, each having a predetermined length and with the roll formed with the links in the collapsed state to reduce the overall diameter of the roll 42.

The rolling apparatus 46 includes a mechanism for pivoting the subsidiary arm 102 so that the roll 42 of chain link fence may be removed. This can be seen with reference to FIGS. 6 and 7. As indicated above the subsidiary frame 102 pivots around the point 104. The pivoting action is accomplished using a pivoting linkage mechanism including links 138, 140, 142 and 144. The link 138 pivots with rotation of the shaft 64 and the shaft is controlled by the handle 70 which is interconnected with the shaft 64 by a toothed belt 146 shown in dotted lines in FIG. 3. As the handle 70 is pulled, this provides movement of the belt 146 in the direction shown by the arrow 148. The shaft 64 as well as a shaft portion of the handle 70 may both be formed with gear portions so as to operate with the toothed belt 146.

The movement of the belt 146 in the direction shown in FIGS. 4 and 5 to the progressive positions shown in FIGS. 6 and 7. Specifically, the link 138 moves upward through a 90° rotation between FIG. 4 and FIG. 7. As the link 138 moves upward, as shown by the arrow 150, this provides for movement of the link 140 in the direction shown by the arrow 152. The movement of the link 140 in turn provides for a pivoting of the link 142 around a pivot point 156. The link 142 is pivoted at the pivot point 156 which is located on the subsidiary frame 102. The other end of the link 142 is connected to the link 144 which in turn is pivoted around a pivot point 158 and with the pivot point 158 located on the main frame 100. The action of the various linkages therefore provides for the movement of the subsidiary frame member 102 in the direction shown by the arrows 106. In order to provide for tension in the linkage system a spring member 160 extends between the link 144 and the main frame 100.

As the subsidiary frame 102 rotates as shown in FIGS. 6 and 7, the belt 108 straightens out to allow for removal of the roll 42. The subsidiary frame 102 also includes an arm member 162 which arm member 162 engages the roll 42 to urge the roll 42 from the dotted position shown in FIG. 7 to the full line position shown in FIG. 7. A support rod 164 may extend outwardly to receive the roll 42 as it is removed from the rolling apparatus 46. Prior to the roll 42 being removed from the rolling apparatus, the roll may be banded at least at one position as shown by the band 166 in FIG. 6. The band 166 preserves the integrity of the roll and once the roll 42 is completely removed it may be banded at a number of positions along its length.

As the roll 42 is being removed as shown in FIGS. 6 and 7, the apparatus 46 also includes a structure for insuring that the arm 130 is moved out of the way. Specifically, the arm 130 rests on a pin member 168 and with the pin member 168 moving in a slot 170. This may be seen clearly with reference to FIG. 8. The pin 168 is at the end of a rod 172 which in turn rests against a double arm member 174. As the subsidiary frame 102 is rotated to the open position shown in FIG. 7, the arm 174 is also rotated to in turn push the pin member 168 up in the slot 170. This happens progressively as shown in FIGS. 6 and 7. As shown in FIG. 7, the arm 130 is completely out of the way so as not to interfere with the removal of the roll 42.

FIG. 9 clearly shows in detail the construction of the roll 42 with the links 44 collapsed on each other. As indicated above the roll 42 has a smaller diameter for a given length of chain link fence 10 than if the roll 42 were formed with the links 44 in an open configuration as shown in FIG. 1A. The present invention therefore provides for the rolls being smaller in diameter than the prior art rolls which allows for a greater number of rolls to be shipped in a given volume of shipping space. If the rolls are shipped on an open trailer, then for a given number of rolls, the height of the load on the trailer will be considerably less. As a specific example it has been determined that for the same length of chain link fence the rolls may be approximately one third smaller in diameter than prior art rolls.

Although the invention has been described with reference to a particular embodiment, it has to be appreciated that various adaptations and modifications may be made and the invention is only too limited by the appended claims.

I claim:

1. An apparatus for rolling chain link fence including an endless belt including a free loop portion, means supporting the endless belt and for providing movement of the endless belt in a particular direction and with the movement of the endless belt producing rotative motion in the free loop portion, means adjacent the free loop portion of the endless belt for feeding progressive portions of the chain link fence into the free loop portion[,] *and including guide means for guiding the chain link fence in a downward path and with the guide means including a bottom portion bent away from the vertical to a more horizontal slope at the position adjacent the free loop portion of the endless belt to guide the chain link fence to a more horizontal path and to partially collapse the individual links as the chain link enters the free loop portion of the endless belt.* the free loop portion of the endless belt and the means adjacent the free loop portion supporting the progressive portions of the chain link fence to have the individual links of the chain link fence *fully* collapse against each other to provide for a tight configuration of the chain link fence within the free loop portion, and the rotative motion of the free loop portion of the endless belt producing a rolling of the progressive portions of the chain link fence with the individual links *fully* collapsed against each other to form a roll of chain link fence with a tight configuration and a small diameter.

2. The apparatus of claim 1 wherein the means for feeding includes vertical rods for guiding the chain link fence in a downward path and with the bottom portion of the rods bent away from the vertical to [a] *the* more horizontal slope at the position adjacent the free loop portion of the endless belt to guide the chain link fence to [a] *the* more horizontal path as the chain link enters the free loop portion of the endless belt.

3. The apparatus of claim 2 additionally including a chain stop mechanism located along the vertical rods and with the chain stop mechanism including members activated to project into the downward path for supporting the chain link fence to allow for a rolling of a predetermined length of the chain link fence while supporting the initial portion of a next predetermined length of chain link fence.

4. The apparatus of claim 1 wherein the means for supporting includes a main frame and a subsidiary frame and with both frames including rollers to support and guide the endless belt and with the subsidiary frame pivotable mounted relative to the main frame and with the subsidiary frame pivoting between a first position wherein the endless belt includes the free loop portion and a second position wherein the free loop portion is straightened out to allow for the removal of the roll of chain link fence.

5. The apparatus of claim 4 wherein the subsidiary frame additionally includes an arm member for engaging the roll of chain link fence as the subsidiary frame is pivoted between the first and the second positions to move the roll off of the endless belt and out of the rolling apparatus.

6. The apparatus of claim 5 additionally including a support surface mounted adjacent the main frame to support the straightened out belt and the roll of chain link fence as the roll is removed.

7. The apparatus of claim 1 additionally including a restraining arm member biased to have a portion of the arm member lie against a top surface of the roll of chain link fence to restrain outward movement of the roll out of the free loop portion as the roll is formed by the free loop portion.

8. The apparatus of claim 7 additionally including means for straightening out the free loop portion of the endless belt to remove a completed roll and with the restraining arm member automatically disengaged when the free loop portion is straightened out.

9. An apparatus for rolling chain link fence, including means for supporting progressively received portions of the chain link fence, means coupled to the means for supporting for producing rotary motion of the means for supporting and in turn producing rotary motion of the progressively received portions of the chain link fence, means adjacent the means for supporting for feeding progressive portions of the chain link fence to the means for supportingl [,] *and including guide means for guiding the chain link fence in a downward path and with the guide means including a bottom portion bent away from the vertical to a more horizontal slope at the position adjacent the free loop portion of the endless belt to guide the chain link fence to a more horizontal path and to partially collapse the individual links as the chain link enters the free loop portion of the endless belt,* the means for supporting and the means for feeding providing a *fully* collapsed state for the individual links of the progressive portions of the chain link fence as the means for supporting produces rotary motion of the progressively received portions, and the rotary motion of the means for supporting producing a rolling of the progressive portions of the chain link fence with the individual links in the *fully* collapsed state to form a roll of chain link fence with a tight configuration and a small diameter.

10. The apparatus of claim 9 wherein the means for feeding includes vertical rods for guiding the chain link fence in a downward path and with the bottom portion of the rods bent away from the vertical to [a] *the* more horizontal slope at the position adjacent the means for supporting to guide the chain link fence to [a] *the* more horizontal path as the chain link enters the means for supporting.

11. The apparatus of claim 10 additionally including a chain stop mechanism located along the vertical rods and with the chain stop mechanism including members actuated to project into the downward path for supporting the chain link fence to allow for a rolling of a predetermined length of the chain link fence while supporting the initial portion of a next predetermined length of chain link fence.

12. The apparatus of claim 9 wherein the means for supporting includes a main frame and a subsidiary frame and with both frames including rollers to support and guide an endless belt and with the subsidiary frame pivotable mounted relative to the main frame and with the subsidiary frame pivoting between a first position wherein the endless belt includes a free loop portion to support and provide the rolling of the progressive portions of the chain link fence and a second position wherein the free loop portion is straightened out to allow for the removal of the roll of chain link fence.

13. The apparatus of claim 12 wherein the subsidiary frame additionally includes an arm member for engaging the roll of chain link fence as the subsidiary frame is pivoted between the first and the second positions to move the roll off of the endless belt and out of the rolling apparatus.

14. The apparatus of claim 13 additionally including a support surface mounted adjacent the main frame to support the straightened out belt and the roll of chain link fence as the roll is removed.

15. The apparatus of claim 9 additionally including a restraining arm member biased to have a portion of the arm member lie against a top surface of the roll of chain link fence to restrain outward movement of the roll out of the supporting means as the roll is formed by the supporting means.

16. The apparatus of claim 15 additionally including means for removing a completed roll and with the restraining arm member automatically disengaged as the roll is removed.

17. A method of rolling chain link fence, including the following steps, providing an endless belt including a free loop portion, supporting the endless belt and providing movement of the endless belt in a particular direction to have the endless belt produce rotative motion in the free loop portion,

*guiding the chain link fence in a downward path and then away from the vertical path to a more horizontal path at the position adjacent the free loop portion of the endless belt to have the individual links of the chain link fence partially collapse against each other,* feeding progressive *partially collapsed* portions of the chain link fence into the free loop portion, supporting the progressive portions of the chain link fence with at least the free loop portion of the endless belt to have the individual links of the chain link fence *fully* collapse against each other to provide for a tight configuration of the chain link fence within the free loop portion, and producing a rolling of the progressive portions of the chain link fence by the rotative motion of the free loop portion and with the individual links *fully* collapsed against each other to form a roll of chain link fence with a tight configuration and a small diameter.

[18. The method of claim 17 including guiding the chain link fence in a downward path and then away from the vertical path to a more horizontal path at the position adjacent the free loop portion of the endless belt.]

19. The method of claim [18] *17* additionally including the step of supporting the chain link fence to allow for a rolling of a predetermined length of the chain link fence while supporting the initial portion of a next predetermined length of chain link fence.

20. The method of claim 17 additionally including the step of straightening out the free loop portion to allow for the removal of the roll of chain link fence.

21. The method of claim 20 including the additional step of engaging the roll of chain link fence with an arm member as the free loop portion is straightened out to move the roll off of the endless belt and out of the rolling apparatus.

22. The method of claim 9 additionally including the step of restraining a top surface of the roll of chain link fence to prevent outward movement of the roll out of the free loop portion as the roll is formed by the free loop position.

23. A method for rolling chain link fence including the following steps,

[feeding progressive portions of the chain link fence,]

*guiding progressive portions of the chain link fence in a downward path and then away from the vertical path to a more horizontal path to provide a feeding of the chain link with the individual links partially collapsed against each other,* providing a *fully* collapsed state for the individual links of the progressively fed portions of the chain link fence, supporting the progressively fed portions of the *fully* collapsed chain link fence, producing rotary motion of the progressively fed portions of the *fully* collapsed chain link fence, and producing a rolling of the progressive portions of the *fully* collapsed chain link fence to form a roll of chain link fence with a tight configuration and a small diameter.

[24. The method of claim 23 including the step of guiding the chain link fence in a downward path and then away from the vertical path to a more horizontal path to provide the feeding.]

25. The method of claim 23 additionally including the step of supporting the chain link fence to allow for a rolling of a predetermined length of the chain link fence while supporting the initial portion of a next predetermined length of chain link fence.

26. The method of claim 25 additionally including the step of removing each roll of chain link fence.

27. The method of claim 26 additionally including the step of engaging the roll of chain link fence with an arm member for removal of each roll.

28. The method of claim 23 additionally including the step of restraining a top surface of the roll of chain link fence to prevent outward movement of the roll as the roll is formed.

* * * * *